Figure 1:
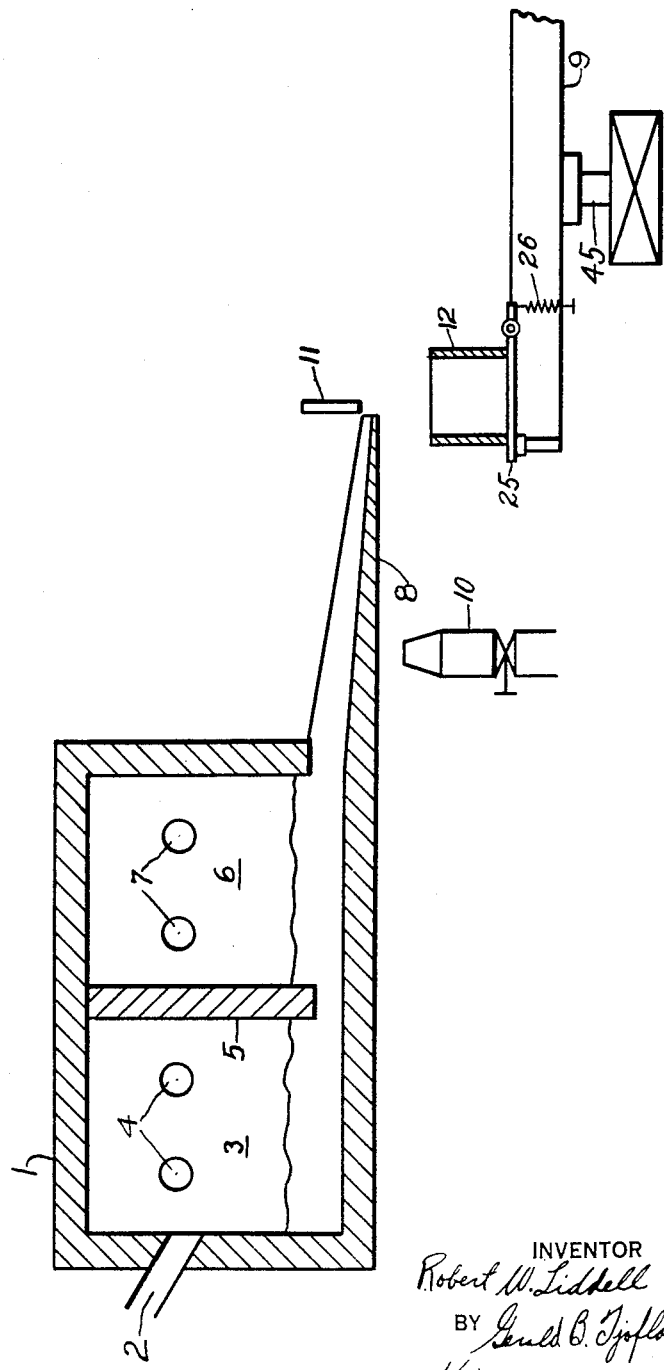

Oct. 2, 1951  R. W. LIDDELL  2,569,936
PHOSPHATE PRODUCT AND METHOD OF MAKING SAME
Filed Nov. 8, 1947  2 Sheets-Sheet 1

WITNESSES:

INVENTOR
Robert W. Liddell
BY Gerald B. Tjoflat
His ATTORNEY

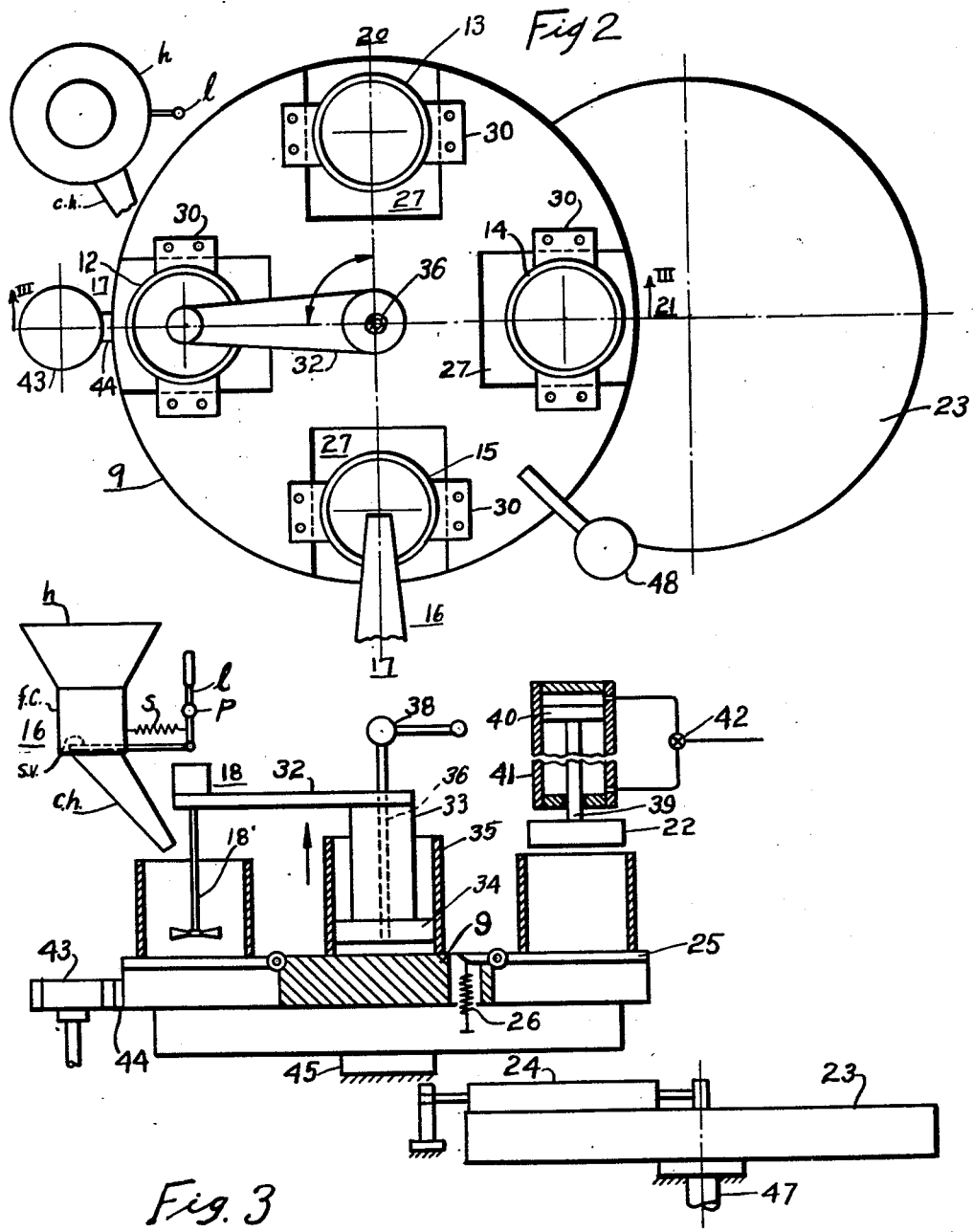

Patented Oct. 2, 1951

2,569,936

UNITED STATES PATENT OFFICE 2,569,936

PHOSPHATE PRODUCT AND METHOD OF MAKING SAME

Robert W. Liddell, Bethel Township, Allegheny County, Pa., assignor to Hall Laboratories, Inc., Pittsburgh, Pa., a corporation of Pennsylvania Application November 8, 1947, Serial No. 784,841

8 Claims. (Cl. 23—106)

This invention relates to a new form of water soluble hardness sequestering phosphate as an article of manufacture and to a process of manufacturing such article.

More specifically, my product, as a new article of manufacture, is an alkali-metal phosphate having among other properties, the hardness sequestering properties of the alkali-metal phosphate glasses and crystalline tripolyphosphate, but whose physical structure or form is cellular or foam-like, and extremely rapidly soluble when added directly to water. The method of this invention is directed to the manner in which the starting materials are treated and used in order to produce an alkali-metal phosphate having a cellular or foam-like physical structure or form.

An object of this invention is to provide a phosphate product that is rapidly soluble in water.

Another object of the invention is to provide a phosphate product which will dissolve substantially completely in a relatively short period of time measured in terms of seconds, for example, in the length of time required for the material to sink to a depth of four to eight inches on being dropped into a body of water.

A still further object of the invention is to provide a glassy alkali-metal phosphate which is light and has a sponge-like or cellular structure and is extremely rapidly soluble when merely added to water.

A still further object of the invention is to provide a method of making a phosphate product having the properties above set forth.

Other objects of the invention will, in part, be apparent and will, in part, be obvious from the following description taken in conjunction with the accompanying drawings in which:

Figure 1 is a more or less schematic view in longitudinal section of a furnace in which the phosphate melt is produced and a fragmentary view partially in section of apparatus for producing the product of the invention from the melt, which apparatus is employed as well in carrying out the method or process of the invention; and Fig. 2 is a top view of a revolving table (shown partially in Fig. 1) provided with reaction vessels into which molten phosphate and gas-liberating materials are charged; and Fig. 3 is a view in longitudinal section taken on line III—III of Fig. 2 of the revolving table as shown in connection with a rolling and quenching table onto which the material in the various reaction vessels is ejected.

The phosphate melt is employed in carrying out the process of this invention. In the manufacture of the product of the invention, the phosphate melt is produced in a gas-fired furnace 1 from suitable starting materials such as hereinafter described.

The starting materials may be charged into the furnace at any appropriate point such as through an opening 2 in the back of the furnace. These materials are melted in a chamber 3 which is heated to the desired or necessary temperature obtained by proper control of burners 4, preferably gas burners. The molten phosphate flows from chamber 3 under a bridge wall 5 into a chamber 6 in which the melt is thoroughly heated through and brought to the desired temperature for further processing. The matter of temperature of the melt is hereinafter more particularly described.

Chamber 6 is likewise heated by gas burners 7, the fuel input to which is adjusted to obtain the desired heating or cooking of the melt before it is discharged from the furnace. The length of chamber 6 may also be designed to insure a thorough cooking and mixing of the melt as the melt flows towards the outlet of the furnace to properly condition the melt before it is further processed with gas-liberating materials. The molten phosphate flows from chamber 6 down a trough 8 from which the melt is discharged into receptacles carried by a rotary table 9. If necessary to prevent prechilling or excessive loss of heat from the melt as it flows down trough 8, heat may be applied to the trough by means of a gas burner 10. A gate 11 is provided at the discharge end of trough 8 to permit shutting off the flow of phosphate melt to accommodate charging of the reaction vessels on table 9.

In Fig. 2, table 9 is shown as having a plurality of reaction vessels 12 to 15, inclusive, uniformly spaced on the table along its periphery.

The gas-liberating materials may be placed in the reaction vessels 12 to 15, inclusive, either before the phosphate melt is poured into them or at the same time, or subsequent to the pouring of the melt. However, as shown in Fig. 2, the arrangement is such that the gas-liberating materials are charged into the reaction vessels ahead of the charging of the phosphate melt. One or more feeders 16, see Figs. 2 and 3, may be employed for depositing measured quantities of gas-liberating material into the reaction vessels before or as they reach station 17. As the table advances clockwise, a reaction vessel containing gas-liberating material comes to position under the discharge end of trough 8, in which position a measured amount of melt is poured into the reaction vessel. The table is then advanced to bring the next reaction vessel to the place where the phosphate melt will flow into it. Meanwhile, a stirring mechanism 18 is placed over the vessel containing phosphate melt and gas-liberating material with a stirrer 18' extending into the vessel whereby the melt and the gas-liberating materials are thoroughly mixed. The stirrer of the stirring mechanism 18 remains in the reaction vessel until it has traveled to station 20, at which time the stirrer is lifted out of the vessel and returned to the position shown in Fig. 2 where it can be inserted into a freshly charged reaction vessel to effect stirring of a new batch or charge. As the table progresses clockwise, it reaches station 21 where the material in the vessel is ejected by means of a piston-operated plunger 22. When material is ejected from the vessel, it is deposited onto a rotating table 23 having a roller 24 adapted to roll over the material to cool the same and also to reduce it to a desired thickness.

Feeder 16 may be of any construction suitable for delivering measured quantities of gas-liberating materials to the receptacles 12 to 15, inclusive, as they are presented under trough 8 to receive phosphate melt. As schematically illustrated, the feeder includes a storage hopper $h$, a feed cylinder f. c., a chute by which material is directed into the respective mixing chambers 12—15 when a slide valve s. v. is opened to release material from the cylinder. Slide valve s. v. may be operated by any suitable mechanism, for example, by means of a lever l pivoted at $p$ and having one end connected to the valve s. v., a spring $s$ being shown as urging the valve to closed position.

As shown more particularly in Fig. 3, each reaction vessel is provided with a hinged bottom 25 which is held normally in closed position by means of a spring 26. The table 9 is provided with openings 27 of such size and shape that the hinged bottoms 25 may swing freely from closed to open position and vice versa. The vessels are provided with support brackets 30 by which they may be secured to the table.

Stirring mechanism 18 is carried on arm 32, the inner end of which is secured to a piston rod 33 having a piston 34 at its lower end disposed in a cylinder 35. The piston rod as shown is provided with a passageway 36 extending through to the pressure face of piston 34 to allow the admission of pressure fluid into the cylinder to raise the stirring mechanism out of a reaction vessel. The operation of the piston may be controlled in any desired manner either automatically or manually. For present purposes, it may be assumed that the control is manual by means of a valve 38.

The ejecting piston 22 is carried by a piston rod 39 having a piston 40 at its upper end working in a cylinder 41. Pressure for operating the piston to raise or lower it may be admitted to either end of the cylinder by means of a valve 42 which controls the supply of a pressure fluid to the cylinder.

Table 9 is arranged to be driven by means of a driving gear 43 meshing with a ring gear 44 extending around the periphery of the table. The table may be mounted on any suitable pedestal disposed at its central position as shown at 45 in Figs. 1 and 3. Table 23 may also be driven in any suitable manner, being mounted on a rotating shaft or pedestal 47.

As the material passes under the cooling and thickness-adjusting roll 24, the material may be scraped off table 23 by means of a scraper 48 which may be adjusted to any desired angular position.

The apparatus above described is, of course, only schematic and admits of various modifications and changes suitable for carrying out the process of the invention and for making the product embodying the invention.

A detailed description of the process and the product follows.

Phosphate glasses of various composition have been in use and are currently supplied to the trade for use as water softeners and for other purposes. These glassy phosphates as supplied to the trade are generally in the form of irregular flat pieces resembling broken window glass, finely ground powder, round or semi-round beads, and thin flakes. The flat pieces, the beads, and the powder have a relatively low surface to weight ratio, whereas the flakes have a high surface to weight ratio.

When added to water, both the irregular flat window glass-like pieces and the beads dissolve very slowly as they sink to the bottom of the container in which the solution is being made. Under such conditions, a gelatinous coating forms on the surfaces of the phosphate particles as there is not sufficient circulation developed to keep the surfaces clean and free of the coating. To obtain relatively quick dissolution, the window glass-like pieces and the bead forms are usually suspended in wire mesh baskets or cloth bags at the surface of the water so that the solution, which is heavier than the water, can set up a circulation that keeps the surfaces of the undissolved particles or pieces clean and readily reactive with the water, whereby dissolution may proceed to completion at a relatively rapid rate, free of the hindering effect of the gelatinous coating above mentioned.

The powdered glass likewise settles to the bottom of the dissolving water accumulating in clumps and dissolving very slowly unless the solution is agitated.

The thin flakes above mentioned when free of imperfectly formed flakes, dissolve very readily and rapidly when added directly to water, because each flake has a very high surface to weight ratio. However, unless considerable care is taken in the manufacture of the flakes, needle-like particles are formed which, if not screened or separated from the flakes, become a part of the finished product. These needle-like particles are relatively unobjectionable in commercial applications, but for domestic or personal uses, they are objectionable in that they jag and prick the hands and skin, and produce a stinging, burning sensation.

My new article of manufacture is light and fluffy, may be crushed in the hands without danger of their being cut, and may be produced in the form of flat pieces of any desired size and thickness, or the pieces may be crushed to a semi-powder form, i. e., to a particle size that will pass a 30 mesh screen.

This product, because of its physical and chemical form, is free of sharp cutting particles, has an extremely high rate of solution, and is therefore particularly suitable for home and personal uses as well as for industrial purposes. The product, as stated above, has the properties of the alkali-metal phosphate glasses, and the crystalline tripolyphosphate, one notable common property being that of softening water by the sequestering principle as disclosed by the U. S. Hall Patent Re. 19,719. With respect to this property; my new product has calcium sequestration properties as good if not better than those forms of sequestering phosphate presently available. By the term sequestering phosphates, I mean such phosphates as will soften waters containing hardness-producing minerals such as calcium and magnesium without precipitating such mineral or minerals, whether or not soap is added to such waters.

Although the preparation of lightweight silicate glassy materials which are cellular or contain numerous gas bubbles is not new in the art, a sequestering phosphate material having such a cellular structure and possessing the property of releasing gases upon being dissolved in water to hasten dissolution and the method of making the same are believed to be new and novel.

In accordance with the invention, a sequestering phosphate may be made which is light and has a glassy foam-like structure and contains entrapped gas bubbles, and may have undecomposed gas-liberating material.

As a starting material I may employ an alkali-metal phosphate glass such as sodium phosphate glass, or mono-sodium dihydrogen phosphate, or phosphoric acid, and an alkali such as soda ash or potassium carbonate, sodium or potassium chloride in the proportions which will yield a glass on quick quenching from the melt.

If a sodium phosphate glass is employed as the starting material, the material is heated to its melting temperature or above and held at that temperature for a length of time which is sufficient to insure removal of water to a point where the melt preferably contains about 0.15% or less by weight of water. While the most suitable product having a foam-like structure can be made by reducing the water content to 0.15%, it is not absolutely essential to meet this requirement in preparing an adequate product of this structure. The melt is then cooled to a temperature near but above the melting point. If the body of the melt is large, the molten phosphate is poured or removed from the body of the melt. Into the portion of the melt so removed and while it is still molten, a gas-liberating material is mixed. During the mixing, gas is liberated as the melt cools whereby a fluffy foam-like mass containing cells of entrapped gas bubbles is formed. After thorough mixing of the gas-liberating material with the mass, the mass is cooled as by quenching on a relatively cold metal surface. Where small batches of the melt are being handled, the gas-liberating material may be stirred into the whole body of the batch which is cooled rapidly as above described to solidify the same.

I have found that by reducing the water content of the melt to 0.15% or less by weight before the gas-liberating material is added, I obtain a product which has an extremely uniform foam structure when cooled. Water is one of the vitrifying agents for phosphate glasses, but by decreasing the water content of the melt, I can produce a glassy product having a minutely cellular structure upon cooling. The water normally present in phosphate glasses has an effect on the rate at which the chemical reaction proceeds when I add an alkali-metal carbonate to produce a foam structure. If the water content is too great, carbon dioxide may be liberated from the carbonate too rapidly, and cause the formation of a non-uniform product which may not be so quickly soluble and may contain cutting particles. Also, by reducing the water content of the phosphate glass melt below the percentage normally present, the viscosity of the melt is increased, so that uniform entrapment of the carbon dioxide bubbles produced when I add the alkali-metal carbonate is more readily accomplished. Although I prefer to reduce the water content of the melt to a predetermined low value before adding a carbonate, I do not intend to limit my invention to a melt, the water content of which has been so reduced, since I have found it possible to make a glass with a cellular structure from melts having a higher water content.

Among the gas-liberating materials suitable for my purpose are the carbonates such as soda ash, lithium carbonate, or potassium carbonate. Alkali-metal oxalates may also be used as a source of carbon dioxide for the purpose above described.

If a sodium phosphate glass is employed as a starting material, I may use a glass having a ratio of $Na_2O$ to $P_2O_5$ within the range of about 0.9:1 to about 1.67:1. The more alkaline glasses, as well as the more acid glasses, do not react as well with carbonate as do the glasses having ratios of $Na_2O:P_2O_5$ between about 0.9:1 to the ratio corresponding to the peritectic which is about 1.4:1. I may also use mixed phosphate glasses such as sodium and potassium phosphate glass, or a mixture of potassium phosphate glass and sodium phosphate glass.

I have made small batches of my new product employing as a starting material, a sodium phosphate glass having a ratio of $Na_2O:P_2O_5$ of about 1.1:1 as follows:

50 grams of sodium phosphate glass was placed in a platinum crucible and heated in an electric furnace to about 1000° C. for about 30 minutes. The crucible was then transferred to another furnace where the contents of the crucible were allowed to cool to about 750° C., the material being held at this temperature in the furnace for about 5 minutes, after which the crucible was removed from the furnace and about 3 grams of finely powdered anhydrous sodium carbonate added to the melt. The carbonate was mixed with a glass stirring rod, stirring vigorously. With the liberation of $CO_2$ the melt puffed up, and when it had puffed up to about maximum volume, the mass was promptly removed from the crucible and placed on a cold metal plate, such as a steel plate. Another steel plate was then placed on the mass to quench it or quickly cool it. The resulting product when solidified had a thickness of about $\frac{1}{16}$ of an inch. If the quenching plate is removed after only a few seconds, the resulting product is likely to be hard and almost entirely free from cracks, but if the plate is permitted to remain in position for over 30 seconds, the resulting material is friable and breaks readily into small pieces.

I have found that similar results may be accomplished if I heat the phosphate glass to about 750° C. and hold it at this temperature for about 1½ hours in the furnace before adding the carbonate with concurrent agitation and cooling as above described. A glass with a cellular structure but less desirable can be produced simply by quick melting.

Although I prefer to add about 6% by weight of carbonate based on the weight of the melt, I may use from about 1% to about 12% by weight depending on the alkalinity desired in the ultimate aqueous solution. My preferred product for household uses will produce a pH in the range from 8-9 in water when sufficient material is used to soften the water. I continue agitation of the mix after adding carbonate until it reaches its maximum volume, at which time I quickly remove the mass from the crucible and cool it between steel plates as heretofore described. If I do not use a quenching plate in cooling the product, the gas bubbles are not as uniformly distributed.

In addition to preparing a water-soluble phosphate glass having a foam structure from previously prepared phosphate glasses, I may also prepare a glass having a similar structure starting with an orthophosphate, or other materials capable of producing a phosphate glass such as soda ash and phosphoric acid. I take 68 grams of mono-sodium orthophosphate monohydrate and partially dehydrate it in a platinum crucible on a hot plate, then place it in a furnace at a temperature of about 1000° C. and further dehydrate it for about one hour. I then remove the crucible from the furnace and place it in a second furnace, cooling it to about 700° C., whereupon I remove it from the furnace and add about 4 grams of sodium carbonate and then follow a similar procedure as that previously described for the manufacture of a phosphate glass having a foam structure.

In addition to the batch processes which I have outlined above, I have found that a foam glass may be produced in a continuous process. Phosphate glass, as a starting material, may be fed to a large furnace, the temperature of which is held at about 1100° C., and melted. When the glass has melted, it may be retained in the furnace as a melt for about 15 minutes. The melt is then caused to flow from the furnace in a trough during which time it may cool to temperatures in the range of about 650° C. to 750° C. When the melt is in this temperature range, the sodium carbonate is mechanically mixed into it. After issuing from the mixer where reaction with the sodium carbonate has progressed to cause a foaming, the molten mass is discharged onto a revolving steel plate or table and quenched. If desired, the mass may, by methods heretofore practiced, be rolled to the desired thickness by one or more rollers riding on said plate. When cooled or quenched, the product may be removed from the plate by appropriate scraping means.

Instead of charging the furnace with a prepared phosphate glass, I may use phosphoric acid and an alkali such as soda ash and heat the same to a molten state in accordance with procedure well known in this art. The melt by whatever starting materials it is obtained, is heated at such temperatures and for such periods of time, as will result in removal of water to the desired content. I prefer that the water content of the melt be about 0.15% or less by weight. The factors of time and temperature determine the ultimate water content.

When the desired water content of the melt is attained, the melt is fed or caused to flow to the point where the gas-liberating material is added. In flowing to this point, the melt cools. I prefer that the melt cool to a temperature at which the viscosity of the melt is neither too high nor too low. If the viscosity is too high, the equipment may become clogged; if too low, gas escapes to the atmosphere and there may be insufficient gas permeation of the melt. I have found that the viscosity of the melt is satisfactory when the temperature thereof is within the range of about 600° C. to 750° C.

I prefer also that the melt should be dehydrated to a low water content. If too much water is present, the melt may be too acid and the reaction between the melt and the gas-liberating material too violent. Also, if the water content of the melt is high, the resulting finished product may be too glassy and will contain sharp cutting particles. If the melt is practically anhydrous, it loses to a certain extent its ability to hold entrapped gas bubbles.

For the above reasons, it is apparent that the point where the gas-liberating material is added to the melt after issuing from the furnace should be so located that the melt will have cooled to a temperature within the above indicated temperature range, i. e., 600° C. to 750° C.

When the gas-liberating materials is added as above described, a part of it may become infused with the melt, but I believe that the gas-liberating material is only decomposed to an unknown extent or degree of decomposition. Thus, where soda ash is mixed into an $(x)Na_2O(y)P_2O_5$ melt (where $x$ and $y$ represent the mol proportions of $Na_2O$ and $P_2O_5$, a small portion of the soda ash may remain unreacted in the melt while a portion may decompose to $Na_2O$ and to $CO_2$.

I have found that small pieces of foam phosphase glass produced by any of the methods disclosed herein will completely disintegrate when dropped into 5 inches of water at a temperature of 40–45° C. with little or no deposition of residual undissolved matter on the bottom of the vessel. The residual matter, if any, is soft and mushy and disappears on touching with the fingers. Finely ground commercial phosphate glasses or flaked glass require a much longer period to dissolve and have inherent in them the disadvantages previously described. Although I have produced my most uniform and most quickly soluble foam glass by reducing the water content of the melt to about 0.15% or less by weight before I add carbonate, I can produce a material from a melt with a higher water content which may be acceptable in many applications even though its rate of solution is not as rapid or its cellular structure as uniform as in the case of the product produced by the preferred method.

The phosphate glass having a minutely cellular structure has a bulk density considerably lower than that of the commercial phosphate glasses. My product has a density in the range of from about 0.1–0.7 gm./cc., whereas the commercial glass in the form of thin flakes having a thickness of the order of 0.001 to 0.005 inch has a density higher than 1.2 gm./cc. Thus for example, a 4–8 mesh sample of my preferred product has a bulk density of about 0.3 gm./cc.

Having thus described my invention, what I claim as new and desire to secure by Letters Patent is:

1. As a new and useful product of manufacture a hardness sequestering alkali-metal phosphate glass which is characterized by its rapid rate of solution in water, its multicellular foam-like structure, and its high degree of friability, said phosphate glass being the product obtained by heating an alkali-metal phosphate glass until molten, continuing heating until the water content is below about 0.15% by weight, adding thereto a solid alkali-metal carbonate whereupon carbon dioxide is liberated and dispersed throughout the melt, and cooling the resultant mixture until it assumes a solid form.

2. The product as described in claim 1 which is a sodium phosphate glass obtained by heating a sodium phosphate glass until molten and adding thereto a sodium carbonate.

3. The method of making a rapidly water soluble, friable, hardness sequestering alkali-metal phosphate glass having a multicellular foam-like structure which comprises heating an alkali-metal phosphate capable of yielding a glass to a temperature in excess of the melting point of the mass and until the water content of the melt is below about 0.15 per cent by weight, mixing with the molten phosphate a solid alkali-metal carbonate whereby carbon dioxide is liberated within to form a foam-like mass, and cooling said mass to solidify the same.

4. The method of making a rapidly water soluble, friable, hardness-sequestering sodium phosphate glass having a multicellular foam-like structure which comprises heating a sodium phosphate glass to a temperature in excess of the melting point of said glass, and until the water content of the melt is below about 0.15 per cent by weight, mixing with the molten phosphate a solid alkali-metal carbonate whereby carbon dioxide is liberated within to form a foam-like mass, and cooling said mass to solidify the same.

5. The method as described in claim 4 characterized by the fact that the sodium phosphate glass used as the starting material has a molar ratio of $Na_2O:P_2O_5$ of from about 0.9:1 to about 5:3.

6. The method as described in claim 4 characterized by the fact that the amount of a solid alkali-metal carbonate added is from about 1 per cent to about 12 per cent by weight of the weight of the molten phosphate to which it is added.

7. The method of making a rapidly water soluble, friable, hardness-sequestering alkali-metal phosphate glass having a multicellular foam-like structure which consists in heating an alkali-metal phosphate capable of yielding a glass to a temperature in excess of the melting point of said glass, forming a relatively large body of molten alkali-metal phosphate, heating the molten phosphate until the water content thereof is less than 0.15 per cent based on the weight of the phosphate, causing the molten phosphate to flow from said body to a mixing station, adding a gas-liberating solid to said molten phosphate at the mixing station, mixing said material into the melt at said station, and cooling the product until it assumes a solid form.

8. The method as described in claim 7 wherein the gas-liberating solid is an alkali-metal carbonate and the amount of gas-liberating solid added is from about 1 per cent to about 12 per cent by weight based upon the weight of the molten phosphate to which it is added.

ROBERT W. LIDDELL.

REFERENCES CITED

The following references are of record in the file of this patent:

UNITED STATES PATENTS

| Number | Name | Date |
|---|---|---|
| 1,947,488 | Newhouse | Feb. 20, 1934 |
| 1,990,925 | Bennett | Feb. 12, 1935 |
| 2,098,431 | Partridge | Nov. 9, 1937 |
| 2,174,614 | Bornemann | Oct. 3, 1939 |
| 2,243,027 | Baker | May 20, 1941 |
| 2,266,328 | McCullough | Dec. 16, 1941 |
| 2,288,418 | Partridge | June 30, 1942 |
| 2,396,918 | Hubbard et al. | Mar. 19, 1946 |